3,178,346
NEW OXIDO-STEROIDS AND PROCESS FOR
THEIR MANUFACTURE
Albert Wettstein, Julius Schmidlin, Karl Heusler, and
Peter Wieland, Basel, Switzerland, assignors to Ciba
Corporation, a corporation of Delaware
No Drawing. Filed Oct. 8, 1959, Ser. No. 845,095
Claims priority, application Switzerland, Oct. 10, 1958,
64,889
15 Claims. (Cl. 167—65)

The present invention provides new saturated and unsaturated 11:18-oxygenated steroids of the partial general formula

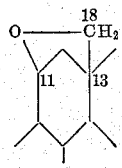

and especially those of the pregnane and adrostane series. A few members of this new class of compounds having an oxygen bridge between the 11- and 18-carbon atoms possess valuable pharmacological properties. Thus the pregnane compounds exert on mineral metabolism an action similar to that of the known adrenal hormones. The androstane compounds have an anabolic action in doses in which the androgenic action is of minor importance. Of special importance are pregnenes of the formula

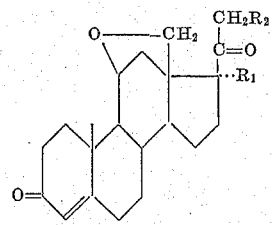

in which $R_1$ represents a hydrogen atom or a free hydroxyl group, and $R_2$ represents a hydrogen atom or a free, esterified or etherified hydroxyl group, and also androstenes of the formula

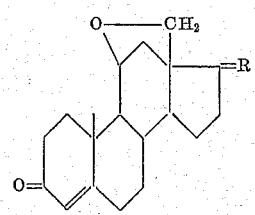

in which R represents a hydrogen atom together with a free, esterified, or etherified hydroxyl group or an alkyl group together with a free hydroxyl group, or an oxo group. The new compounds are also useful as intermediate products for the manufacture of medicaments. Thus they may be oxidised with the aid of chromium trioxide or ruthenium tetroxide to obtain the corresponding (11→18)-lactones, which are either physiologically active themselves or represent intermediates, e.g., for the synthesis of aldosterone type compounds.

The new 11β:18-oxido-steroids are obtained by treating a saturated or unsaturated 11β:18-dihydroxy-steroid or an O-monoacyl-derivative thereof, especially an 18-O-acyl derivative thereof, with an agent capable of splitting off water or acid, and, if desired, esterifying any hydroxyl group present in the resulting 11β:18-oxido-steroid and/or hydrolyzing any acetalized oxo group. The said 11β:18-oxido-steroids can be obtained by the process of this invention in a very simple and unexpected manner by treating an 11β:18-dihydroxy-steroid with an acid, for example, a lower aliphatic carboxylic acid, such as acetic acid or propionic acid, advantageously in the presence of water. A further advantageous form of the process consists in splitting off acid from an O-monoacyl-derivative, especially an 18-O-acyl derivative, of an 1β:18-dihydroxy-steroid by means of a base, for example, an alkali salt of carbonic acid, such as an alkali hydrogen carbonate, in an aqueous alcohol, for example, aqueous methanol. The initial esterification and splitting off of acid in accordance with the process can be carried out with advantage in a single operation, for example, by the action of a halide of an acid of phosphorus or of sulfuric acid or by the action of a sulfonic acid halide, for example, paratoluene sulfochloride or methane sulfochloride, and a tertiary amine, such as pyridine, collidine, etc.

The products of the process are saturated or unsaturated, racemic or optically active 11:18-oxido-steroids, among which there are hereinafter included also 19-nor and D-homo-steroids. There may be mentioned, more especially, 4- or 5-unsaturated 11:18-oxides of the pregnane series having oxygen substituents at positions 3 and 20 or 3, 20 and 21 or 3, 17, 20 and 21, or containing radicals convertible into such substituents, and also 4- or 5-unsaturated 11:18-oxido-compounds of the androstane series having oxygen substituents in the 3- and 17-position or radicals convertible into such substituents. The aforesaid 11:18-oxido-steroids may possess any desired configuration and, in addition to any further double bonds present, for example, in the 1-, 6-, 7-, 14- or 16-positions, may be further substituted, for example, by free or functionally converted hydroxyl groups, oxo groups or halogen atoms. If desired, hydroxyl groups present in the resulting 11:18-oxido-steroids may be esterified by a method in itself known by reaction with a reactive derivative of a saturated or unsaturated aliphatic, cycloaliphatic, aromatic or heterocyclic carboxylic acid, preferably of lower aliphatic, monocyclic cycloaliphatic, aromatic or heterocyclic carboxylic acid, lower monocyclic araliphatic or cycloaliphatic carboxylic acid, for example, with such derivative of formic acid, acetic acid, chloracetic acid, trifluoroacetic acid, carbamic acids, alkoxy-carboxylic acids, propionic acid, butyric acids, lactic acid, valeric acids such as n-valeric acid or trimethyl-acetic acid, diethyl-acetic acid, caproic acids such as β-trimethyl-propionic acid, oenanthic, caprylic, pelargonic, capric or undecylic acids, for example, undecylenic acid, lauric, myristic, palmitic or stearic acids, for example, oleic acid, or crotonic acid, undecane acid, cyclopentyl-, cyclohexyl- or phenyl-acetic acids or -propionic acids, hexahydrobenzoic acid, benzoic acid, phenoxyalkane acids such as phenoxy-acetic acid, para-chloro-phenoxy-acetic acid, 2:4-dichlorophenoxy-acetic acid, 4-tertiary-butyl phenoxy-acetic acid, 3-phenoxy-propionic acid, 4-phenoxy-butyric acid, furane-2-carboxylic acid, 5-tertiary-butyl-furane-2-carboxylic acid, 5-bromo-furane-2-carboxylic acid, nicotinic acid, or isonicotinic acid, and also dicarboxylic acids, such as oxalic acid, succinic acid, maleic acid, glutaric acid, dimethyl-glutaric acid, pimelic acid, acetone-dicarboxylic acid, phthalic acid, tetrahydrophthalic acid, hexahydrophthalic acid, endomethylene-tetrahydrophthalic acid, endomethylene-hexahydrophthalic acid, endoxy-hexahydrophthalic acid, endoxy-tetrahydrophthalic acid, camphoric acid, cyclopropane dicarboxylic acid, cyclobutanedicarboxylic acid, diglycollic acid, ethylene-bis-glycollic acid, polyethylene-bis-glycollic acids, quinolinic acid, cinchomeronic acid, and also the polyethylene glycol monoalkyl ether semi-esters of the aforesaid dicarboxylic acids, or keto-carboxylic acids such as β-keto-carboxylic acids, for example, acetoacetic acid, propionyl-acetic acid, butyryl-acetic acid, caprionoyl-acetic acid, amino-acids such as diethylamino-acetic acid etc. Instead of carboxylic acids there may be used sulfonic acids, such as methane sulfonic acid or toluene sulfonic acid, and also inorganic acids, such as phosphoric or sulfuric acids.

The 11β:18-dihydroxy-steroids used as starting materials or their 18-O-acyl-derivatives are more especially those of the pregnane and androstane series. They can be made by methods in themselves known from the appropriate (18→11)-lactones or from 11β-hydroxy-18-aldehydes or their 11:18-semi-acetals or 11:18-semi-acetal-acylates by reduction with complex metal hydrides, such as lithium-aluminum hydride, aluminum borohydride and sodium borohydride. In this method of preparation any oxo groups present are, if desired, first protected by acetalization or ketalization. During the conversion into the new 11β:18-oxido-steroids with acids, in this case, the protective groups can be removed simultaneously, so that the free final products are obtained in an especially simple manner in a single process step.

Apart from the free 11β:18-dihydroxy-compounds, there may be used as starting materials in the process described above, their O-monoacyl-derivatives, especially their 18-O-acyl-derivatives. They are obtainable from the 11β:18-diols in known manner by reaction with reactive derivatives of saturated or unsaturated aliphatic or cycloaliphatic, araliphatic, aromatic or heterocyclic carboxylic acids, and especially the carboxylic acid halides or anhydrides. The reaction is carried out in the presence of an acid-binding agent, for example, a tertiary base, such as pyridine, dimethylaniline or collidine, or a salt of the acid in question.

The invention also includes compositions for use in human or veterinary medicine, which contain the aforesaid 11β:18-oxido-steroids and a solid or liquid carrier for medicaments. These compositions can be prepared by methods in themselves known, for example, with the use of pharmaceutical organic or inorganic carriers suitable for parenteral, enteral or topical administration. As carriers there are used substances that do not react with the products of this invention, for example, water, vegetable oils, benzyl alcohols, polyethylene glycols, gelatine, lactose, starches, magnesium stearates, talc, white petroleum jelly, cholesterol or other carriers for medicaments. Especially suitable are preparations for parenteral administration, advantageously solutions, and preferably oily or aqueous solutions, and also suspensions, emulsions, implantation preparations. For enteral administration there are likewise used tablets or dragees, and for topical administration salves or creams may be used. If desired, the preparations may be sterilised or may contain auxiliary substances, such as preserving, stabilising, wetting, or emulsifying agents, salts for regulating the osmotic pressure or buffers. The content of active substance in these preparations, such as an ampoule or a tablet is within the range of 0.1–200 milligrams, or 0.03–60%.

The following examples illustrate the invention:

*Example 1*

A solution of 366 mg. of the partially acetylated d,l - $\Delta^5$ - 3:3;20:20 - bis - ethylenedioxy - 11β:18:21 - trihydroxy-pregnene described below in 7.5 cc. of acetic acid of 90% strength is boiled under reflux for one hour in an atmosphere of nitrogen. The mixture is then cooled, the greater part of the acetic acid is evaporated in vacuo while adding a total of 15 cc. of water, and the suspension, which has been concentrated to a volume of 2.5 cc., is extracted with methylene chloride. The extracts are washed with an 0.5 N-solution of sodium hydrogen carbonate and water, then dried with sodium sulfate and evaporated after being combined. There is obtained a crystalline crude product, which is split up by chromatography in the system formamide/cyclohexane-benzene (1:2) after application to 100 sheets of Whatman paper No. 1 (18.5 x 45 cm.). After drying the paper at 40° C. in a high vacuum, the two main zones having $R_f$-values of 0.10–0.16 and 0.58 to 0.66, which strongly reduce blue tetrazolium salt and absorb in the ultra-violet spectrum, are eluted with aqueous tetrahydrofurane of 20% strength and of 40% strength, the collected extracts are concentrated in vacuo to about 1/50 of their original volumes, and the two concentrates are extracted with methylene chloride. The extracts are washed with a small quantity of water; dried with sodium sulfate, and are evaporated, whereby 93 mg. of a crystalline residue from the lower zone and 80 mg. of a crystalline residue from the upper zone remain behind.

The crude eluate from the lower zone is dissolved in 3 cc. of benzene, the solution is filtered through a column of 250 mg. of active carbon followed by washing the column with benzene, and the colorless filtrate is evaporated in vacuo. From the residue there are obtained by recrystallisation from a mixture of methylene chloride and ether 66 mg. of d:l-$\Delta^4$-3:20-dioxo-11β:18-oxido-21-acetoxy-pregnene melting at 132–134° C./152–154° C. (dimorphism).

The crude eluate from the upper zone is dissolved in 3 cc. of tetrahydrofurane and purified over 80 mg. of active carbon in an analogous manner. From the acetone-ether solution there are obtained 58 mg. of d:l-$\Delta^4$-3:20-dioxo-11β:18-oxido-21-hydroxy-pregnene melting at 168–170° C. By subjecting the latter to the action of an excess of acetic anhydride and pyridine for 14½ hours at room temperature, the ketol is substantially quantitatively converted into the acetate melting at 132–134° C./152–154° C. isolated from the lower zone.

The starting material used in this example may be prepared as follows:

1.116 grams of the (18→11)-lactone of d:l-$\Delta^5$-3:3;20:20-bis-ethylenedioxy-11β:21-dihydroxy-pregnene-18 - acid are covered with 37.5 cc. of anhydrous tetrahydrofurane and 25.3 cc. of a 1.0-molar solution of lithium alanate in tetrahydrofurane, and the mixture is stirred for 122 hours at room temperature in an atmosphere of nitrogen. The reaction mixture is diluted with 137.5 cc. of anhydrous tetrahydrofurane and cooled to 0–3° C., and there is added in the course of one hour an anhydrous mixture of 6.25 cc. of ethyl acetate and 18.75 cc. of tetrahydrofurane, then a mixture of 2.3 cc. of water and 23 cc. of tetrahydrofurane is added in the course of a further hour, and finally 1.0 gram of purified kieselguhr is added. After a further 30 minutes' stirring at 0–3° C., the suspension is filtered with suction through a thin layer of kieselguhr, followed by washing with 225 cc. of tetrahydrofurane, and the filtrate is evaporated in vacuo. The crystalline residue obtained from ether is crude d:l-$\Delta^5$-3:3;20:20-bis-ethylenedioxy-11β:18:21-trihydroxy-pregnene, which can then be used directly in the acetylation described below. The product can be obtained in a very pure form by adsorption chromatography over 50 times its weight of silica gel. It is dissolved from this adsorbent with ethyl acetate, and crystallises from ether in small clusters melting at 118–120° C./148–150° C. (dimorphism).

A solution of 369 mg. of crude d:l-$\Delta^5$-3:3;20:20-bis-ethylene-dioxy-11β:18:21-trihydroxy-pregnene in 14.5 cc. of a 1-molar mixture each of acetic anhydride and pyridine in anhydrous tetrahydrofurane is allowed to stand with the exclusion of moisture for 21 hours at room temperature, then the reaction solution is evaporated first under the reduced pressure of a waterjet pump and then under a high vacuum pump while a total of 27.5 cc. of toluene is added, and the residue is taken up in ether. By repeatedly applying ether and evaporating, there are finally obtained 366 mg. of an almost completely crystalline acetylation product, which is used directly for the treatment with acetic acid of 90% strength described above.

*Example 2*

A solution of 204 mg. of d:l-$\Delta^5$-3:3;20:20-bis-ethylene-dioxy-11β:18-dihydroxy-pregnene in 4 cc. of acetic acid of 50% strength is heated for 15 minutes on a boiling water bath in an atmosphere of nitrogen. After cooling the mixture to room temperature, the greater part of the acetic acid is distilled off while adding a total of 4.5 cc. of water, and the aqueous residue is extracted with methylene chloride. The methylene chloride extracts are washed with an 0.5 N-solution of sodium-hydrogen carbonate and water, dried with sodium sulfate and evaporated. The crude product is transferred to 80 sheets of Whatman paper No. 1 (18.5 x 45 cm.) for purification and is chromatographed "down to the edge" in the system formamide/cyclohexane-benzene (1:1). From the strongly ultra-violet absorbing zone having an Rf-value of 0.60–0.73 there are obtained, by elution with aqueous tetrahydrofurane of 20% strength and of 40% strength, distilling off the tetrahydrofurane and extractively working up the concentrate with methylene chloride, 140.4 mg. of a product which, after recrystallisation from ether, yields 114 mg. of pure d:l-$\Delta^4$-3:20-dioxo-11$\beta$:18-oxido-pregnene melting at 162° C./178–181.5° C. (dimorphism).

The starting material used in this example is prepared as follows:

To a solution of 808 mg. of the (18→11)-lactone of d:l-$\Delta^5$-3:3;20:20-bis-ethylenedioxy-11$\beta$-hydroxy-pregnene-18 acid in 33 cc. of anhydrous tetrahydrofurane are added in the course of 15 minutes, while stirring, 4.1 cc. of an 0.460-molar solution of lithium-aluminum hydride in tetrahydrofurane. When the mixture has been stirred for a further 3¾ hours at room temperature, the opalescent solution is poured, followed by rinsing out with 8.1 cc. of tetrahydrofurane, on to a mixture of 18.8 cc. of a 1-molar solution of potassium sodium tartrate, 7.5 cc. of 0.5 molar tartaric acid and 26.5 grams of ice, and the whole is concentrated in vacuo to a final volume of 15 cc. The aqueous suspension is then extracted with methylene chloride, the extract is washed with a 1-molar solution of potassium sodium tartrate and with water, and dried with sodium sulfate and evaporated. The residue crystallises almost completely from ether, and is crude d:l-$\Delta^5$-3:3;20:20-bis-ethylenedioxy - 11$\beta$:18 - dihydroxy-pregnene melting at 150–155° C. The product is sufficiently pure for the treatment with acetic acid of 50% strength described above.

A solution of 88 mg. of d:l-$\Delta^5$-3:3;20:20-bis-ethylenedioxy-11$\beta$:18-dihydroxy-pregnene in 2.0 cc. of benzene and 0.085 cc. of anhydrous pyridine, which solution has been prepared with the exclusion of moisture in an atmosphere of nitrogen, is mixed dropwise in the course of 15 minutes with 0.70 cc. of trifluoracetic anhydride, while cooling with ice. When the dropwise addition is complete, the cooling bath is removed and the whole is stirred for a further five hours at room temperature. The reaction mixture is then poured onto a mixture of 5 cc. of a 2 N-solution of sodium carbonate and 7.5 grams of ice, and is extracted with benzene. The benzene extracts are washed with 0.5 N phosphoric acid, a 2 N-solution of sodium carbonate and with water, the combined extracts are dried with sodium sulfate and evaporated. From the benzene-free residue there are obtained by recrystallisation from a mixture of ether and petroleum ether (1:1) 84 mg. of pure d:l-$\Delta^5$-3:3;20:20-bis-ethylenedioxy-11$\beta$:18-bis-trifluoracetoxy-pregnene melting at 196.5–199° C. with slight decomposition.

*Example 3*

To a solution of 3.9 mg. of d:l-$\Delta^4$-3:20-dioxo-11$\beta$-hydroxy-18-acetoxy-pregnene in 0.5 cc. of methanol is added 0.10 cc. of an 0.5-molar solution of potassium hydrogen carbonate, and the mixture is allowed to stand at room temperature for 96 hours in an atmosphere of nitrogen. At the end of this period the reaction solution is freed from methanol by concentration in vacuo with the addition of water, and the aqueous residue is extracted with methylene chloride. The extract solution is washed with water, dried with sodium sulfate and evaporated. The residue is chromatographed "down to the edge" in the system formamide/cyclohexane-benzene (1:1) on four sheets of Whatman paper No. 1 (18.5 x 45 cm.). The zone which absorbs ultra-violet light and has an Rf-value of 0.7–0.8 is dried for 16 hours in a high vacuum, the paper is then eluted with aqueous tetrahydrofurane of 20% strength, the combined extract solutions are concentrated in vacuo to 1/20 of their original volume, and the concentrate is extracted with methylene chloride. The methylene chloride extracts are washed with water, dried and evaporated. The residue (2.6 mg.) yields, after recrystallisation from a mixture of methylene chloride and ether, d:l-$\Delta^4$-3:20-dioxo-11$\beta$-18-oxido-pregnene melting at 162° C./178–181.5° C. (dimorphism).

The starting material used in this example can be prepared from the d:l-$\Delta^5$-3:3;20:20-bis-ethylenedioxy-11$\beta$:18-dihydroxy-pregnene described in Example 2 in the following manner:

A solution of 612 mg. of crude d:l-$\Delta^5$-3:3;20:20-bis-ethylenedioxy-11$\beta$:18-dihydroxy-pregnene in 5.75 cc. of anhydrous pyridine is mixed with 3.35 cc. of acetic anhydride, and the mixture is heated for 2 hours with the exclusion of moisture in a bath having a temperature of 65° C. The reaction solution is then evaporated under a high vacuum pump, the residue is dissolved in a small amount of ether, and, after evaporation, there are obtained 680 mg. of crude crystalline d:l-$\Delta^5$-3:3;20:20-bis-ethylenedioxy-11$\beta$-hydroxy-18-acetoxy-pregnene.

680 mg. of the latter compound are covered with 17 cc. of acetic acid of 67% strength, and the mixture is heated for 30 minutes on a boiling water bath in an atmosphere of nitrogen, while stirring. After being cooled, the reaction mixture is concentrated to about 3 cc. with the addition of a total of 20 cc. of water, the aqueous residue is extracted with methylene chloride, the extract is washed with an 0.5 N-solution of sodium hydrogen carbonate and with water, then dried with sodium sulfate and evaporated. There are obtained 524 mg. of a crude product, which is split up by chromatography in the system formamide/cyclohexane-benzene (1:2), after being applied to 140 sheets of Whatman paper No. 1 (18.5 x 45 cm.). The chromatogram which extends "down to the edge" exhibits three zones that absorb ultraviolet light strongly. The uppermost zone having an Rf-value of 0.12–0.23 is cut out, dried in a high vacuum for 16 hours, and then eluted with aqueous tetrahydrofurane of 20% strength and of 50% strength. The combined extracts are concentrated in vacuo to about 1/50 of their original volume, and the concentrate is then extracted with benzene. The extracts are washed with a small amount of water, dried with sodium sulfate, and evaporated. There are obtained 189 mg. of a crystalline eluate and there are obtained therefrom by recrystallisation from a mixture of methylene chloride and ether 166 mg. of pure d:l-$\Delta^4$-3:20-dioxo-11$\beta$-hydroxy-18-acetoxy-pregnene melting at 190.5–192.5° C.

*Example 4*

A collected fraction of crude d:l-$\Delta^5$-3:3-ethylenedioxy-11$\beta$:17$\beta$ - dihydroxy-18-acetoxy-androstene, obtained in the manner described below from 720 mg. of d:l-$\Delta^5$-3:3-ethylenedioxy - 11$\beta$ - hydroxy-17-oxo-18-acetoxy-androstene by reduction with sodium borohydride followed by chromatographic separation on silica gel, is treated in boiling acetone with 20 mg. of Carboraffin then filtered to remove the active carbon and evaporated in vacuo. The residue is dissolved in a small amount of methylene chloride, and by allowing the solution to stand with the addition of ether 35 mg. of the reduction product used separate out. The remainder is taken up in 10 cc. of benzene, and chromatographed on 30 grams of silica gel containing 15% of water. From the fractions dissolved out with a mixture of benzene and ethylacetate (9:1) there is obtained, after recrystallisation from a mixture of acetone and ether, pure d:1-Δ⁵-3:3-ethylenedioxy-11β:18-oxido-17β-acetoxy-androstene melting at 213.5–218.5° C.

A solution of 38 mg. of d:1-Δ⁵-3:3-ethylenedioxy-11β:18-oxido-17β-acetoxy-androstene in 1.1 cc. of acetic acid of 90% strength is heated for 10 minutes at 100° C. The reaction mixture is cooled and evaporated under a high vacuum with repeated additions of benzene, and the residual oil is dissolved in a small amount of ether. Upon standing colorless crystals of d:1-Δ⁴-3-oxo-11β:18-oxido-17β-acetoxy-androstene melting at 162–164.5° C. separate out.

The starting material used in this example may be prepared as follows:

A solution of 31 mg. of sodium borohydride in 0.5 cc. of water and 10 cc. of tetrahydrofurane is added, while stirring to a solution of 800 mg. of d:1-Δ⁵-3:3-ethylenedioxy-11β-hydroxy-17-oxo-18-acetoxy-androstene in 40 cc. of anhydrous tetrahydrofurane. After six hours a further 5 mg. of sodium borohydride are added, and the whole is stirred for a further 16 hours at room temperature. The excess of reducing agent is then decomposed by the addition of 1.1 cc. of acetic acid of 10% strength, the mixture is diluted with 150 cc. of water and 100 cc. of a saturated solution of sodium chloride, and extracted with chloroform. The extract solution is washed with saturated sodium chloride solution and with water, then dried and evaporated. The residue is dissolved in 10 cc. of benzene and chromatographed over 40 grams of silica gel containing 15% of water. From the fractions eluted with mixtures of benzene and ethyl acetate (9:1) and (17:3) there are obtained by recrystallisation from a mixture of methylene chloride and ether 440 mg. of d:1-Δ⁵-3:3 - ethylenedioxy - 11β:18-dihydroxy-17β-acetoxy-androstene melting at 191.5–193.5° C. The substance (145 mg.) dissolved out with a mixture of benzene and ethyl acetate (7:3) yields, on recrystallisation from a mixture of methylene chloride and ether, d:1-Δ⁵-3:3-ethylene-dioxy-11β:17β-dihydroxy-18-acetoxy-androstene melting at 209.5–212.5° C. with decomposition.

160 mg. of d:1-Δ⁵-3:3-ethylenedioxy-11β:18-dihydroxy-17β-acetoxy-androstene are dissolved in 12 cc. of ethanol of 95% strength and, after the addition of 0.1 gram of platinum oxide, hydrogenated to completion. The solution is filtered to remove the catalyst, and by evaporating the solution there is obtained d:1-3:3-ethylenedioxy-11β:18-dihydroxy-17β-acetoxy-androstane.

*Example 5*

To a solution of 90 mg. of d:1-Δ⁵-3:3-ethylenedioxy-11β:18-dihydroxy-17β-acetoxy-androstene in 1 cc. of pyridine are added, while stirring, 50 mg. of para-toluene sulfochloride, and the mixture is allowed to stand for 17 hours at room temperature. The reaction mixture is then poured onto ice and the aqueous phase is extracted with methylene chloride. The extract solution is washed with a 1 N-solution of sodium carbonate and with water, then dried and evaporated. The residue yields from a mixture of methylene chloride and ether crystals which sublime at 170° C. in a high vacuum. By recrystallising the sublimate from a mixture of methylene chloride and ether, there is obtained d:1-Δ⁵-3:3-ethylene-dioxy-11β:18-oxido 17β-actoxy-androstene melting at 213.5–218.5° C., which is identical with the ketal obtained as described in Example 4.

The starting material used in this example can be prepared according to the directions given in Example 4. By using as starting material in this example the corresponding saturated diol, namely d:1-3:3-ethylenedioxy-11β:18 - dihydroxy - 17β - acetoxy - androstane, the preparation of which is described at the end of Example 4, there is obtained d:1-3:3-ethylenedioxy-11β:18-oxido-17β-acetoxy-androstane.

What is claimed is:

1. Process for the manufacture of a member selected from the group consisting of 11β:18-oxido-androstanes and 11β:18-oxido-pregnanes, wherein the corresponding 11β:18-dihydroxy-steroid is reacted with a member selected from the group consisting of an acid, a halide and anhydride thereof and any resulting 18-O-acyl derivative is treated with a base.

2. Process as claimed in claim 1, wherein a tertiary amine is used as base.

3. Process as claimed in claim 2, wherein pyridine is used as base.

4. Process as claimed in claim 1, wherein the halide of a sulfonic acid is used.

5. Process as claimed in claim 1, wherein para-toluene sulfonyl chloride is used as the halide of a sulfonic acid.

6. Process as claimed in claim 1, wherein a lower aliphatic carboxylic acid is used as acid.

7. Process as claimed in claim 6, wherein acetic acid is used as acid.

8. Process as claimed in claim 1, wherein an alkali metal salt of carbonic acid in an aqueous alcohol is used as base.

9. Process as claimed in claim 8, wherein an alkali hydrogen carbonate in aqueous methanol is used.

10. A compound of the formula

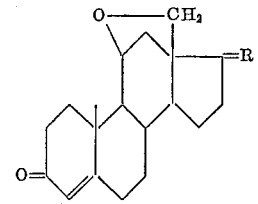

in which R represents a member selected from the group consisting of oxo, β-hydroxy and hydrogen, β-hydroxy and lower alkyl and β-acyloxy and hydrogen, the acyloxy radical being derived from a fatty acid having 2 to 18 carbon atoms.

11. 11β:18-oxido-progesterone.

12. 11β:18-oxido-testosterone acetate.

13. 3:3-ethylenedioxy-11β:18-dihydroxy-17β - acetoxy-androstane.

14. A pharmaceutical composition comprising the compounds claimed in claim 10, containing the active ingredient in an amount ranging from 0.03–60% together with a suitable pharmaceutical carrier.

15. A pharmaceutical composition comprising the compound claimed in claim 11, containing the active ingredient in an amount ranging from 0.03–60% together with a suitable pharmaceutical carrier.

References Cited by the Examiner

UNITED STATES PATENTS 2,904,545   9/59   Reichstein et al. _____ 260—239.55
2,959,586   11/60  Kerwin et al. _____ 260—239.55
3,040,039   6/62   Wettstein et al. _____ 260—239.55

OTHER REFERENCES

Heusler et al.: Helvetica Chim. Acta (1958), vol. 41, No. 4, page 1006.

LEWIS GOTTS, *Primary Examiner.*

L. H. GASTON, *Examiner.*